Feb. 23, 1965     A. WEINKLE     3,170,349

DOWN CUTTER ASSEMBLY

Filed Oct. 25, 1962     5 Sheets-Sheet 1

INVENTOR.
ABRAHAM WEINKLE
BY
ATTORNEY

INVENTOR.
ABRAHAM WEINKLE
BY
ATTORNEY

United States Patent Office 3,170,349
Patented Feb. 23, 1965

3,170,349
DOWN CUTTER ASSEMBLY
Abraham Weinkle, Reading, Pa., assignor to American Safety Table Company, Inc., Reading, Pa., a corporation of Pennsylvania
Filed Oct. 25, 1962, Ser. No. 232,986
7 Claims. (Cl. 83—140)

This invention relates generally to cutting mechanisms, and more particularly, relates to cutting mechanisms usable in conjunction with a variety of different types of work utilities and so positioned relative to the operating head of such a utility that it is capable of severing action, if desired, at a point relatively close to the operating head. The cutting mechanism according to the invention is adapted to sever a wide range of substances, such as textile fabrics, leather, plastics and paper in various forms such as webs, sheets, film, tapes, cords and threads. The severing capability of the apparatus according to the invention is of course limited to articles which do not exceed the width of the cutting blade.

Typcially, the work utility might be a sewing machine, a heat sealing plastics fusing machine, an automatic gluing machine, a wire stapling machine, or other devices which will readily suggest themselves. In this regard, for purposes of illustration only, the invention will be hereinafter described as embodied in a device adapted for securement to and use with a sewing machine head, and is so shown in the drawings. As shown, the illustrated embodiment of the invention is adapted to sever a generally stretchable and non-tearable woven fabric tape which has been stitched to a wider piece of fabric. As will be hereinafter described, the illustrated embodiment utilizes spreader elements which engage the tape for tautening the same prior to severance thereof, but it will be appreciated that the use of such spreader elements may be dispensed with in certain instances.

The illustrated embodiment of the invention has advantageous application to the sewing art since, in the past, cutting mechanisms for use with sewing machines have been characterized by the necessity for the operator of the sewing machine to hand hold the fabric to be cut in a taut condition in order to insure that a clean or complete cut was achievable. This arrangement is disadvantageous from a safety standpoint, and moreover, it is also time consuming.

A principal object of this invention is to provide a novel down cutting mechanism for attachment to and use with work utilities which includes means for clamping the material to be severed prior to operation of the cutting device.

Another object of this invention is to provide a novel down cutting apparatus as aforesaid which includes a material clamp and a pair of spreading devices for pulling taut the material to be severed, and which also protectively encloses the sharp edged severing device to protect personnel against accidental cuts.

A further object of this invention is to provide a novel down cutter device for use in conjunction with a work utility together with control circuitry for the actuation thereof in conjunction with auxiliary equipment for the automatic removal and/or stacking of the articles just completed.

The foregoing and other objects of the invention will become clear from a reading of the following specification in conjunction with an examination of the appended drawings, wherein.

In the several figures, like elements are denoted by like reference characters.

Figure 1:
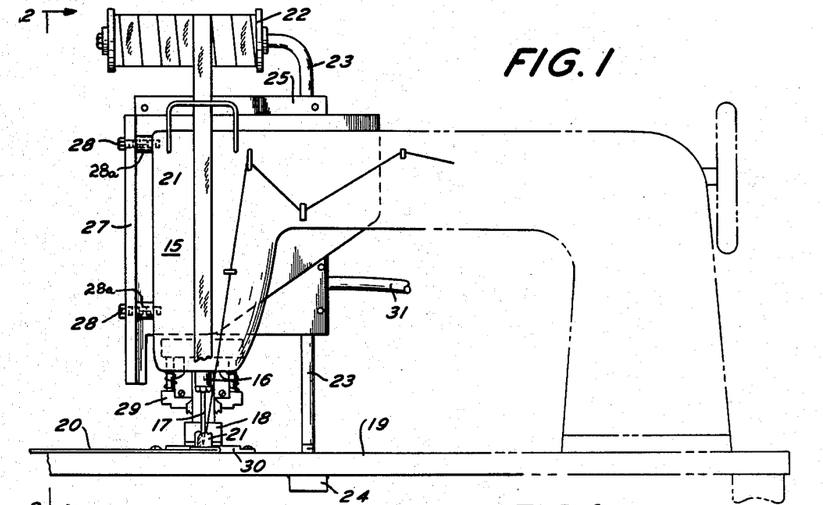
FIGURE 1 is a front elevational view of the stitching head portion of a sewing machine with the down cutting mechanism according to the invention attached in operative position thereto, and with the downcutter in actuated or down position.
Figure 2:
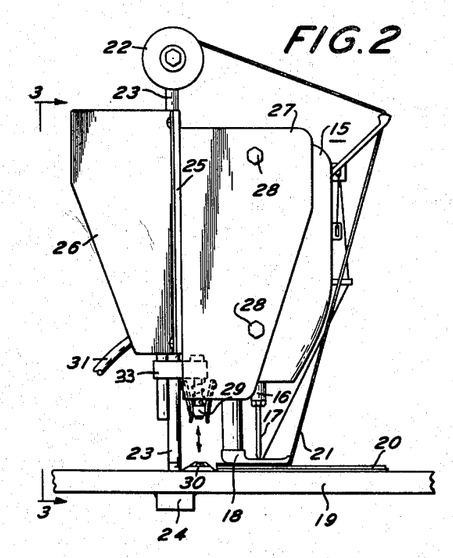
FIGURE 2 is an end elevational view of the sewing machine and down cutter of FIGURE 1 as would be seen when viewed from the left hand end along line 2—2 thereof, the down cutter cutting mechanism being shown in retracted or up position.

Considering first FIGURES 1 and 2, there will be seen a sewing machine head designated generally as 15 which is provided with the conventional reciprocable needle bar 16 carrying needle 17, and vertically shiftable presser foot 18, the sewing machine head 15 being secured to and carried by the underlying sewing machine bed plate 19 which is supported by a table or stand (not shown). As shown, the presser foot 18 is in its down position to hold the material which is in the process of being stitched, the material being stitched comprising the flat cloth 20 reverse folded at the edge which is under the needle 17 and a narrow tape 21 disposed immediately on top of the cloth 20 for stitching thereto, the tape 21 being continuously drawn from a supply roll 22 mounted above the sewing machine head 15, as for example by means of the bracket arm 23 which extends vertically downward behind the sewing machine head 15 and is secured to the bed plate 19 by means of the internally threaded boss 24 secured to the undersurface of the latter. Of course, the tape supply roll 22 may be otherwise supported if so desired, as for example by mounting it to a support carried by the head 15, or alternatively by support means completely independent of the sewing machine.

The operating mechanism of the down cutter device itself is all mounted to a back plate 25 and enclosed within a cover 26, the back plate 25 being secured to an L-shaped mounting bracket 27 which is carried by the sewing machine head 15, being secured thereto as by means of the bolts 28 and spacers 28a. When so mounted, the vertically reciprocable portion of the down cutter, as for example as shown by the cloth holder bar 29, is centered behind the presser foot 18 with its long dimension oriented at right angles to the direction of feed of the sewing machine head. The bottom plate or anvil 30 is of course secured to the bed plate 19 beneath the cloth holder bar 29 and oriented for proper registry with the cutter blade of the down cutter device. As will be seen, actuation of the down cutter mechanism is accomplished by electrical energization of a solenoid and for this purpose a power cable 31 is required.

Figure 3:
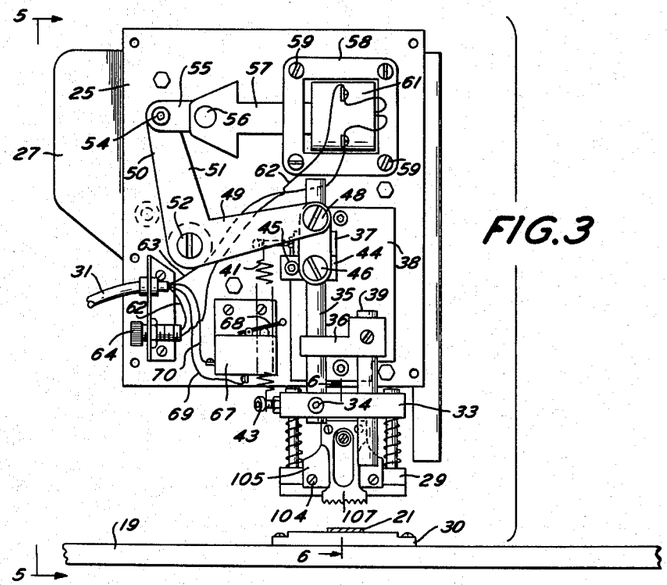
FIGURE 3 is a rear view of the down cutter mechanism on an enlarged scale as would be seen when viewed along the line 3—3 of FIGURE 2 and with the rear cover removed, the reciprocable cloth spreader and the cutter head being shown in retracted or up position.
Figure 4:
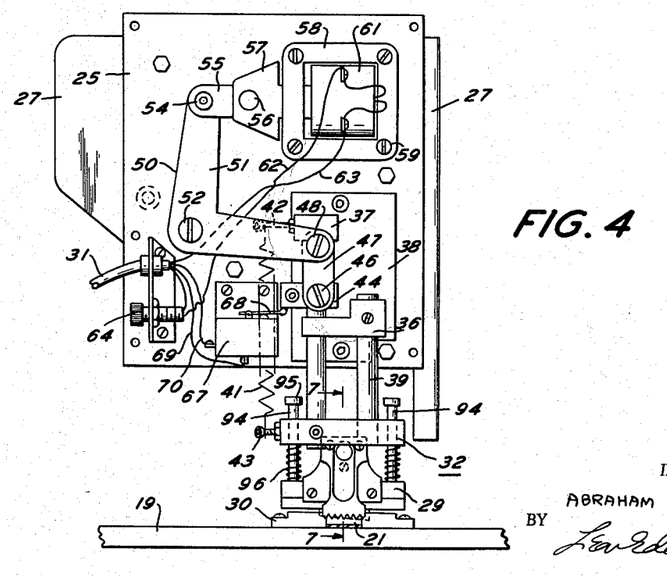
FIGURE 4 is similar to the showing of FIGURE 3 but illustrates the cutter head and spreader device in down or actuated position.
Figures 5, 6, 7, 8:
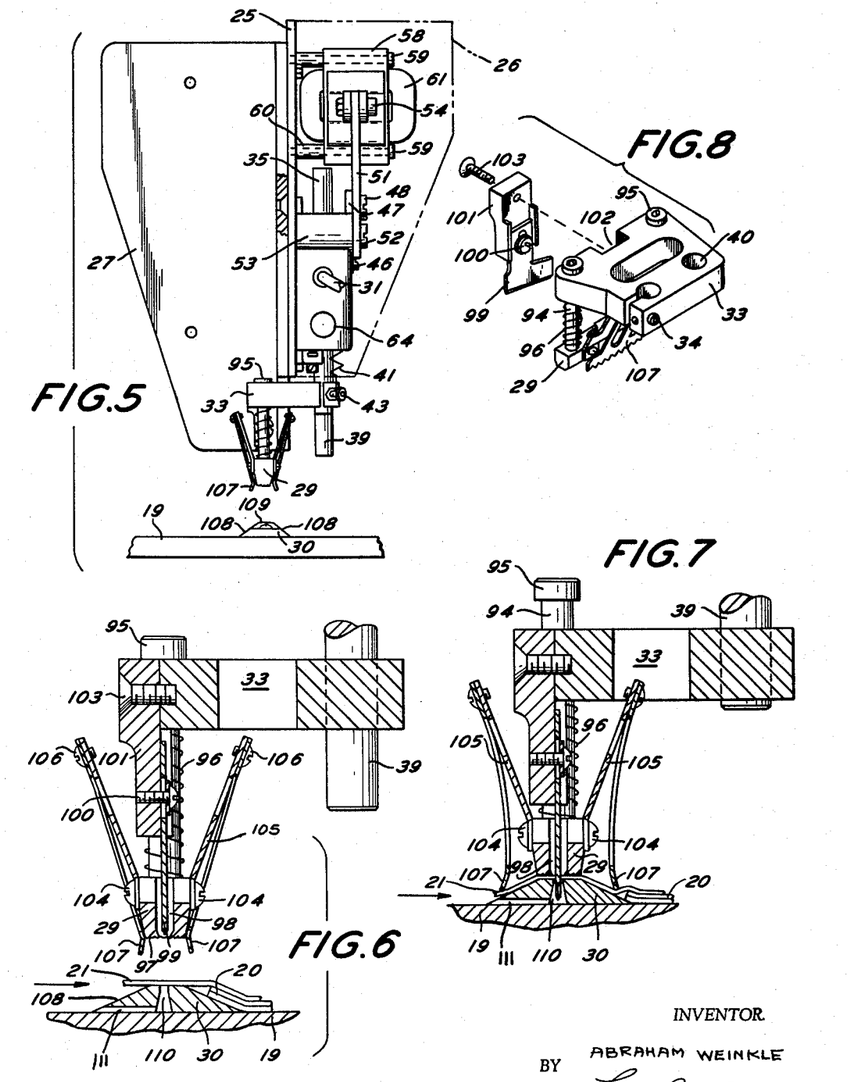
FIGURE 5 illustrates the down cutter device of FIGURE 3 as would be seen when viewed from the left along the line 5—5 thereof.
FIGURE 6 is an enlarged vertical sectional view through the reciprocable cutter and spreader head of the down cutter device as would be seen when viewed along the line 6—6 of FIGURE 3.
FIGURE 7 is substantially the same as FIGURE 6 but shows the down cutter in actuated or down position as would be seen when viewed along the line 7—7 of FIGURE 4.
FIGURE 8 is a perspective view of the shiftable head of the down cutter showing one of the cloth spreaders and the cutter blade mounting block, the latter being shown in detached or exploded view.

As best seen in FIGURES 3, 4 and 5 the down cutting apparatus includes the visible vertically reciprocable cutting head portion designated generally as 32, and the apparatus for causing the vertical reciprocation of the cutting head. Considering first this latter aspect, namely the driving mechanism for the cutting head, it is observed that the cutting head main block 33 is fixedly secured by means of a set screw 34 to the lower end of a shaft 35. The shaft 35 extends vertically upward through close fitting bores in journal blocks 36 and 37 carried by support 38 secured to the back plate 25. Secured to and extending vertically downward from journal block 36 is a guide bar 39 which projects close fittingly slidably through a bore 40 extending vertically through cutting head main block 33, as best seen in FIGURE 8, the guide bar 39 preventing rotation of the main block 33 and maintaining fixed alignment thereof with the underlying anvil 30 during vertical reciprocation of the main block.

The cutting head is maintained in its deactuated upwardly retracted position by means of extension coil spring 41 anchored at its upper end to stud 42 extending from journal block 37 and anchored at its lower end to stud 43 extending from the cutting head main block 33. Carried by shaft 35 is a stop block 44 secured to the shaft by means of bolt 45. The stop block 44 is so positioned axially of the shaft that the retractive action of spring 41 is terminated by engagement of the stop block upper face with the lower face of journal block 37 when the cutting head assembly 32 is raised to its desired position.

Actuation of the cutting head assembly 32 to depress the same is effected by an electrically energizable solenoid coupled to the shaft 35 through a pivoted linkage system connected to stop block 44 carried by the shaft. The stop block is pivotally connected by means of a shoulder screw 46 to the lower end of a link 47, the upper end of which link 47 is pivotally connected by shoulder screw 48 to the right hand end of the generally horizontal lower arm 49 of L-shaped lever 50. The lever 50 is also provided with a generally vertical upper arm 51 and is pivotally secured at the intersection of the arms 49 and 51 by means of a shoulder screw 52 to a boss 53 extending from the backplate 25. The upper terminal of lever upper arm 51 is pivotally secured as by the nut and bolt 54 to the clevis end of a link 55, the opposite end of which link is pivotally secured by link pin 56 to the plunger 57 of solenoid 58, the latter being secured to the back plate 25 by means of bolts 59 and spacers 60.

Figure 14:
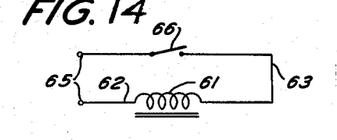
FIGURE 14 is a simple schematic diagram for the actuation of the down cutter by means of an electrically energizable solenoid.

The solenoid coil 61 is illustrated in FIGURES 3 and 5 in its deenergized state in which condition the solenoid plunger 57 is extended to the left, this position being brought about by the action of spring 41 which pulls up the cutting head assembly 32 to thereby pivot the lever 50 by forcing up the outer end of the lever lower arm 49 at its shoulder screw pivot 48. When the solenoid coil 61 is energized through fused conductor 62 and conductor 63, the fuse being shown at 64, the solenoid plunger 57 is pulled sharply to the right, as shown in FIGURE 4, to thereby drive the cutting head assembly 32 downward through the shaft 35 and linkage system which interconnects the shaft with the solenoid plunger 57. For a simple cutting operation the solenoid coil 61 may be energized via the conductors 62 and 63 in the manner shown in FIGURE 14 from a source of electrical power 65 through a manually operable switch 66. The switch 66 could of course be foot operated if so desired. The cutting head assembly 32 will be held in its down position so long as the solenoid coil 61 remains energized and will retract upon opening of the switch 66 to deenergize the solenoid coil.

In the event that a garment removal device such as a stacker is desired to be utilized with the sewing machine to automatically remove a garment which has been completely stitched it is necessary to insure that the down cutter device has been disengaged from the stitched article in order to prevent damage to the garment or to the down cutter apparatus itself when the garment removal device operates. This is provided for in the following manner, reference being made to FIGURES 3, 4 and 15. As best seen in FIGURES 3 and 4 a switch 67 is secured to the back plate 25 so that the pivotal switch arm 68 is depressed by engagement with the undersurface of stop block 44 when the latter descends due to energization of the solenoid coil 61. Upon depression of the switch pivot arm 68, which occurs at the completion of the down cutting stroke, the switch 67 is closed and completes a circuit between conductors 69 and 70 which form part of the power cable 31.

Figure 15:
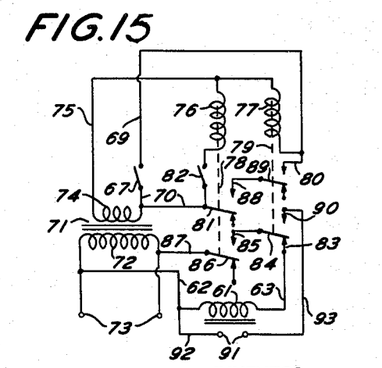
FIGURE 15 is an electrical schematic diagram illustrating control circuitry for the automatic sequential operation of the down cutter device and a garment removal apparatus.

Referring now to FIGURE 15 there will be seen a transformer 71 having a primary winding 72 energizable from a source of power 73, the transformer also having a secondary winding 74, one side of which connects via conductor 75 to one end of each of coils 76 and 77 of relays 78 and 79 respectively. Conductor 69 connected to switch 67 also connects to the opposite end of the relay coil 77 and to contact 80 of relay 78 and one side of a manually operable switch 82, the other side of switch 82 connecting to the remaining end of relay coil 76. Conductor 62 of solenoid coil 61 connects to one terminal of the power source 73 while conductor 63 of the solenoid coil 61 connects to contact 83 of relay 79 normally in engagement with pole 84, which latter connects to contact 85 of relay 78 normally disengaged from pole 86 when relay 78 is deenergized.

Pole 86 of relay 78 is connected to the other side of the power source 73 by conductor 87 so that when relay 78 transfers its poles to bring pole 86 into engagement with contact 85 a circuit will be closed through coil 61 of the down cutter solenoid to thereby actuate the down cutter mechanism. Energization of relay coil 76 to actuate the relay 78 is brought about by closure of manual switch 82 to thereby energize the relay coil from transformer secondary winding 74. The down stroke of the cutting head assembly closes switch 67 in the manner previously described and thereby energizes relay coil 77 of relay 79 to cause relay poles 89 and 84 to respectively engage contacts 80 and 90. The disengagement of pole 84 from contact 83 breaks the circuit to the down cutter solenoid coil 61, which thereupon causes the immediate upward retraction of the cutting head assembly, and engagement with contact 90 completes the circuit from power terminals 73 to contacts 91 via conductors 92, 93, contact 90, pole 84, contact 85, pole 86 and conductor 87.

The upward retraction of the cutting head assembly 32 of course opens switch 67 but does not cause the deenergization of relay 79 because a holding current circuit has been established through pole 81 and contact 88 of relay 78 and pole 89 and contact 80 of relay 79. The now energized terminals 91 provide a source of power for actuation of the garment removal device previously mentioned, and it will be appreciated that the energization of terminals 91 occurs immediately after deenergization of the down cutter solenoid. It will be thus understood that the garment removal device cannot be operated until the down cutter mechanism has been retracted and disengaged from the completed garment which it is desired to remove.

Details of the cutting head assembly 32 are most clearly seen in the showings of FIGURES 3 through 8 to which attention should be now directed. Projected slidably downward through bores in the cutting head main block 33 are a pair of parallel studs 94 each threaded at its lower end for rigid securement to the horizontally extending cloth holder bar 29. Each of the studs 94 is provided with an enlarged head 95 seatable flatwise upon the upper surface of the main block 33 to prevent disengagement of the stud shaft from the main block 33 because of the biasing action of compression springs 96 disposed about the studs 94 which urge the cloth holder bar 29 strongly downward away from the cutting head main block 33. The cloth holder bar 29 is knurled or serrated on its under surface 97 to provide a positive grip upon the underlying article to be cut, as for example the tape 21, in the manner best seen in FIGURE 7.

Additionally, the cloth holder bar 29 is vertically slotted as at 98 to accommodate therewithin the vertically positioned cutter blade 99, which latter is secured by a machine screw 100 to a blade holder block 101. The blade holder block 101 fits closely within a recess 102 formed in the cutting head main block 33 and is secured in position by means of machine screw 103. Fixedly secured to the front and rear vertical faces of the cloth holder bar 29 as by means of the machine screws 104 are the front and rear cloth spreader holder plates 105 which extend angularly upward and respectively forward and backward. Secured to these holder plates 105 at their upper ends as by means of self tapping screws 106 are the spring metal cloth spreaders 107. The cloth spreaders 107 extend downward from their points of securement to serrated lower edges which project below the bottom surface 97 of the cloth holder bar 29, the serrations providing a cloth gripping edge.

As previously described, the bottom plate 30 is disposed directly below the down cutter and secured to the sewing machine bed plate 19. It will be observed that the bottom plate 30 is of trapezoidal shape in cross section having a pair of sloping sides 108 and a horizontal upper base 109 of shorter length than the separation between the bottom ends of the cloth spreaders 107. The bottom plate 30 is also vertically slotted as at 110 to permit penetration of the cutter blade 99 thereinto and is horizontally opened as at 111 to permit cut threads and chips to move laterally out of the slot 110 and prevent loading of the latter.

As the cutting head assembly 32 descends to sever the tape 21, the serrated lower edges of the cloth spreaders 107 engage the tape 21 at the upper ends of the sloping faces 108 of the bottom plate 30. As the cutting head assembly continues its downward motion the cloth spreaders 107 are cammed respectively forwardly and rearwardly by the bottom plate faces 108 as shown in FIGURE 7, and thereby stretch the tape 21 tightly over the surface of the bottom plate 30. This spreading action of the cloth spreaders 107 continues until the undersurface 97 of the cloth holder bar 29 presses down upon the upper surface of the tape 21 to thereby clamp the tape between the cloth holder bar and the upper horizontal surface 109 of the bottom plate 30. The cloth holder bar 29 and cloth spreaders 107 are now prevented from further downward motion but the cutting head main block 33 is not so restrained and continues its downward motion against the biasing force of the compression springs 96 disposed about the studs 94 to thereby drive the cutter blade 99 downward past the under surface 97 of the cloth holder bar 29 and into the slot 110 of the bottom plate 30, severing the tape 21 as it descends. The tape 21 is of course cut very cleanly by virtue of the fact that it is first pulled taut by the cloth spreaders 107, then firmly clamped between the upper surface 109 of the bottom plate 30 and the knurled under surface 97 of the cloth holder bar 29, and then severed while held in this taut clamped position.

As best seen in the showing of FIGURE 2, the down cutter bottom plate 30 is positioned behind the needle 17 and presser foot 18 at a distance determined by the position of the knife enclosing cloth holder bar 29, which distance is in turn determined by the relatively fore and aft positioning of the down cutter assembly back plate 25 carried by the mounting bracket 27. Since the front to back distance between the presser foot 18 position and the rear side of the sewing machine head 15 varies from one make of sewing machine to another, it will be appreciated that the position of the bottom plate 30 relative to the presser foot 18 will vary from sewing machine to sewing machine because the cutting head main block 33 which carries the cutting knife assembly is of fixed dimension. If fore and aft adjustability of the cutting head of the down cutter is either necessary or desirable then the modified form of the invention illustrated in FIGURES 9 through 13 may be used.

The modified form of cutting head assembly 112 is similar to the previously described assembly 32 in that it includes a cloth holder bar 29′ secured to a generally T-shaped main block 113 by a pair of spaced apart parallel studs 94′ projected slidably downward through bores in the main block 113 and into rigid threaded securement to the cloth holder bar 29′. Each of the studs 94′ is provided with an enlarged head 95′ seatable flatwise upon the upper surface of the main block 113 to prevent disengagement of the stud shaft from the main block because of the biasing action of compression springs 96′ disposed about the studs 94′ and which urge the cloth holder bar 29′ strongly downward away from the cutting head main block 113.

The cloth holder bar 29′ is vertically slotted as at 98′ to accommodate therewithin the vertically positioned blade 99′, which latter is secured by a machine screw 114 to the front face of the head piece 115 of the T-shaped main block 113. The cutter blade 99′ is vertically adjustable, within limits, relative to the head piece 115 by reason of the elongated hole 116 through which the shank of machine screw 114 passes.

Fixedly secured to the front and rear vertical faces of the cloth holder bar 29′ as by means of the machine screws 104′ are the front and rear cloth spreader holder plates 105′ which extend angularly upward and respectively forward and backward. Secured to these holder plates 105′ at their upper ends, as by means of self tapping screws 106′, are the spring metal cloth spreaders 107′. The cloth spreaders 107′ extend downward from their points of securement to serrated lower edges which project below the bottom surface of the cloth holder bar 29′, the serrations providing a cloth gripping edge.

Figures 9, 12, 13:
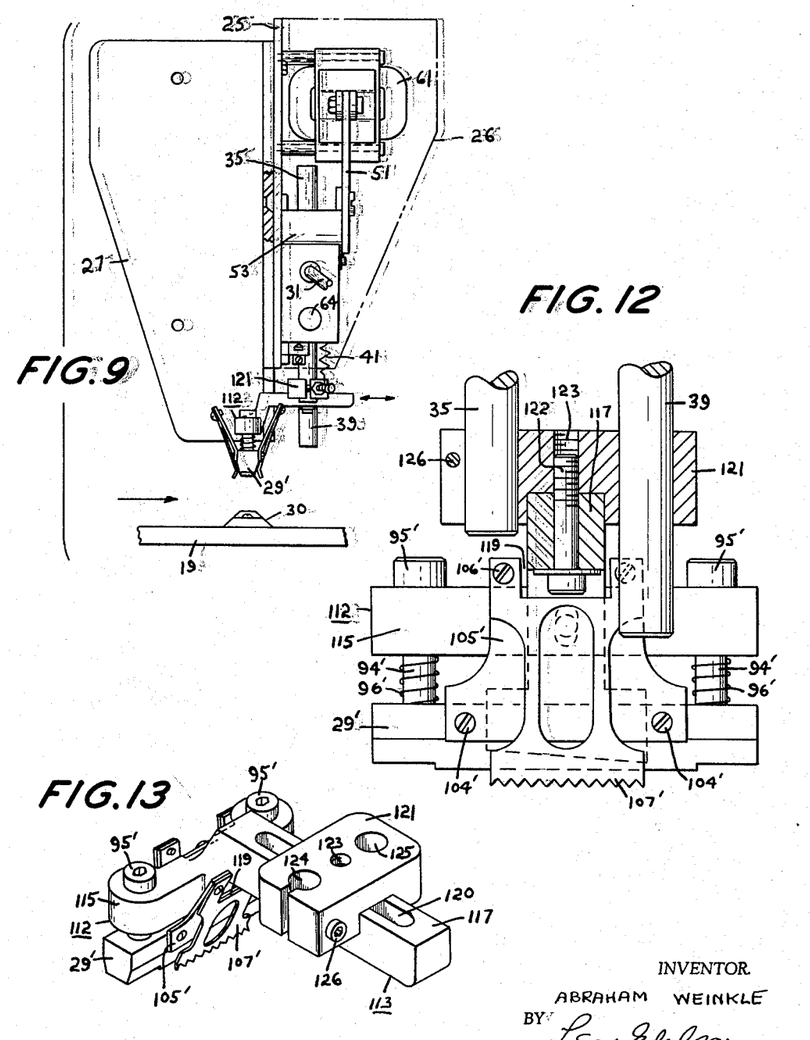
FIGURE 9 is similar to the showing of FIGURE 5 but illustrates a modified reciprocable cutter and spreader head of the down cutter device which includes means for fore and aft positional adjustment of the head.
FIGURE 12 is a vertical sectional view through the reciprocable head of the down cutter device as would be seen when viewed along the line 12—12 of FIGURE 10.
FIGURE 13 is a perspective view of the modified shiftable head of the down cutter device showing the cloth spreaders and the adjustment drive block for adjustably shifting fore and aft the location of the cutter and spreader head.
Figure 10:
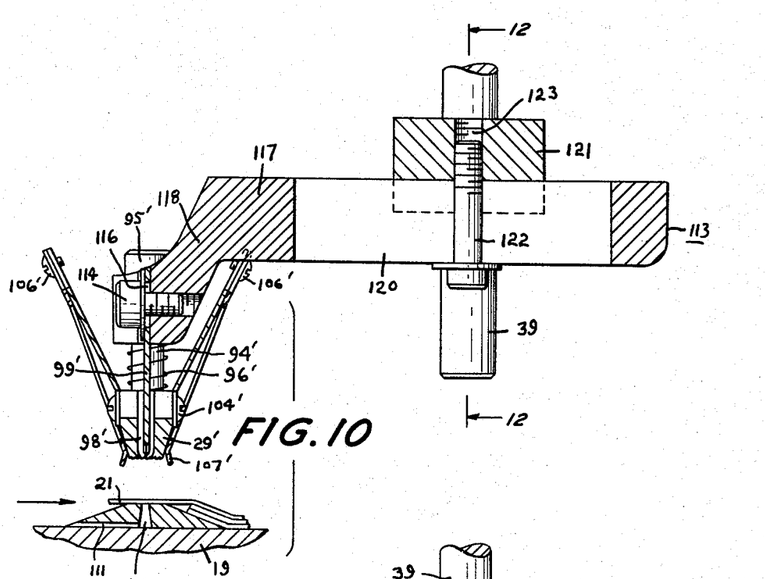
FIGURE 10 is an enlarged vertical sectional view through the modified recpricoble cutter and spreader head of FIGURE 9 and corresponds to the showing of FIGURE 6.
Figure 11:
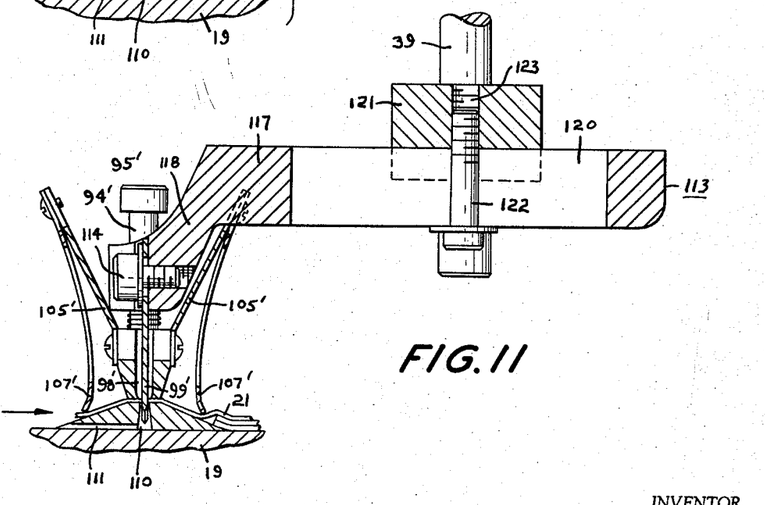
FIGURE 11 is substantially the same as FIGURE 10 but shows the modified down cutter in actuated or down position, corresponding position-wise to the showing of FIGURE 7.

The T-shaped main block 113 is formed so that the elongated stem piece 117 is vertically upwardly offset relative to the transversely disposed head piece 115 and is joined thereto by a bridging portion 118. As best seen in FIGURES 12 and 13, the cloth spreaders 107′ and holder plates 105′ are each centrally vertically downwardly recessed as at 119 to prevent interfering engagement therewith by the main block stem piece 117 when the down cutter device is actuated as shown in FIGURE 11.

The stem piece 117 is provided with a vertical central slot 120 extending completely therethrough from top to bottom and for the major length of the stem piece. Seated down upon the stem piece 117 with the upper portion of the stem piece projecting close fittingly upward into a channel recessed upward from the bottom thereof is a drive block 121. The drive block 121 and main block stem piece 117 are longitudinally shiftable relative to one another with the stem piece 117 movable lengthwise through the channel in the drive slot 121, and are securable fixedly together in any particular adjusted position by means of the bolt 122 projected upward through the slot 120 of stem piece 117 and into threaded engagement with the threaded hole 123 formed in the drive block 121 in vertical alignment with the slot 120 of the stem piece 117. The drive block 121 is additionally provided with a pair of bores 124 and 125 within which are respectively disposed the drive shaft 35 and guide bar 39, the drive block 121 being rigidly secured to the drive shaft 35 by means of the set screw 126.

From the foregoing it will be appreciated that the spreader elements 107 and 107' aid materially in effecting a clean and positive cut of tough fabrics. However, in some applications these spreader elements may be dispensed with, reliance being then had solely upon the clamping action of the bar 29 against the tape overlying the anvil 30. This would be preferred, for example in cases where the tape 21 is made of a readily tearable material which might be rent by the serrated edges of the spreaders.

Having now described my invention in connection with particularly illustrated embodiments thereof it will be appreciated that variations and modifications of my invention may now occur from time to time to those persons normally skilled in the art without departing from the essential scope or spirit of the invention, and accordingly it is intended to claim the same broadly as well as specifically as indicated by the appended claims.

What is claimed as new and useful is:

1. A downcutter apparatus for use in conjunction with a work utility secured to a work surface for severing a worked upon article from trailing fabric and filaments, comprising in combination,
   (1) a bottom plate secured in operative position close behind the operating head of the work utility and so oriented that work passes thereover after being operated on by said operating head, said bottom plate being vertically slotted through its upper surface with the slot length disposed transversely to the direction of feed of the work utility and including front and rear camming surfaces disposed respectively in front of and behind said slot,
   (2) a cutting head assembly vertically reciprocable between a deactuated position and an actutaed position, including,
      (a) clamp means operative to press down to the upper surface of said bottom plate when said cutting head assembly is actuated to thereby clamp the material overlying the bottom plate,
      (b) front and rear resilient spreader means secured to and shiftable with said clamp means conjointly operative with said bottom plate front and rear camming surfaces respectively to grasp the material overlying the bottom plate and pull the same taut across the bottom plate slot when said cutting head assembly is actuated, said spreader means extending downward below said clamp means to thereby engage the material to be cut and pull the same taut before the latter is clamped by said clamping means,
      (c) severing means operative to sever the material clamped over the bottom plate by passing downward therethrough into the bottom plate slot, and
   (3) means coupled to said cutting head assembly for actuating and deactuating the same.

2. A downcutter apparatus for use in conjunction with a work utility secured to a work surface for severing a worked upon article from trailing fabric and filaments, comprising in combination,
   (1) a bottom plate secured in operative position close behind the operating head of the work utility and so oriented that work passes thereover after being operated on by said operating head, said bottom plate being vertically slotted through its upper surface with the slot length disposed transversely to the direction of feed of the work utility,
   (2) a cutting head assembly vertically reciprocable between a deactuated position and an actuated position, including,
      (a) clamp means operative to press down to the upper surface of said bottom plate when said cutting head assembly is actuated to thereby clamp the material overlying the bottom plate, said clamping means being formed with a vertical slot extending therethrough oriented for substantially complete registration with the slot through said bottom plate when said cutting head assembly is actuated,
      (b) severing means operative to sever the material clamped over the bottom plate by moving downward thereagainst through said vertical slot formed in said clamp means after said clamp means have clamped the material to said bottom plate,
      (c) a main block to which said severing means is rigidly secured,
      (d) guide means coupling said clamp means to said main block for vertical shifting motion toward and away from one another within predetermined limits,
      (e) resilient biasing means effective to bias said clamp means and main block maximally away from one another when said cutting head assembly is deactuated, and
   (3) means coupled to said cutting head assembly for actuating and deactuating the same.

3. A downcutter apparatus for use in conjunction with a work utility secured to a work surface for severing a worked upon article from trailing fabric and filaments, comprising in combination,
   (1) a bottom plate secured in operative position close behind the operating head of the work utility and so oriented that work passes thereover after being operated on by said operating head, said bottom plate being vertically slotted through its upper surface with the slot length disposed transversely to the direction of feed of the work utility and including front and rear camming surfaces disposed respectively in front of and behind said slot,
   (2) a cutting head assembly disposed in above lying vertically spaced relation to said bottom plate for vertical reciprocation between an upwardly retracted deactuated position and a downwardly extended actuated position, including,
      (a) shiftable clamp means operative when said cutting head assembly is actuated to clamp the material overlying the bottom plate to the latter, said clamping means being formed with a vertical slot extending therethrough oriented for substantially complete registration with the slot through said bottom plate when said cutting head assembly is actuated,
      (b) front and rear resilient spreader means secured to and shiftable with said clamp means conjointly operative with said bottom plate front and rear camming surfaces respectively to grasp the material overlying the bottom plate and pull the same taut across the bottom plate slot when said cutting head assembly is actuated, said spreader means extending downward below said clamp means to thereby engage the material to be cut and pull the same taut before the latter is clamped by said clamping means,
  (c) severing means operative to sever the material pulled taut over the bottom plate by moving downward thereagainst through said vertical slot formed in said clamp means after said clamp means have clamped the material to said bottom plate, and
(3) selectively operable drive means coupled to said cutting head assembly for actuating and deactuating the same.

4. A downcutter apparatus for use in conjunction with a work utility secured to a work surface for severing a worked upon article from trailing fabric and filaments, comprising in combination,
(1) a bottom plate secured in operative position close behind the operating head of the work utility and so oriented that work passes thereover after being operated on by said operating head, said bottom plate being vertically slotted through its upper surface with the slot length disposed transversely to the direction of feed of the work utility and including front and rear camming surfaces disposed respectively in front of and behind said slot,
(2) a cutting head assembly disposed in above lying vertically spaced relation to said bottom plate for vertical reciprocation between an upwardly retracted deactuated position and a downwardly extended actuated position, including,
  (a) shiftable clamp means operative when said cutting head assembly is actuated to clamp the material overlying the bottom plate to the latter, said clamping means being formed with a vertical slot extending therethrough oriented for substantially complete registration with the slot through said bottom plate when said cutting head assembly is actuated,
  (b) front and rear resilient spreader means secured to and shiftable with said clamp means conjointly operative with said bottom plate front and rear camming surfaces respectively to grasp the material overlying the bottom plate and pull the same taut across the bottom plate slot when said cutting head assembly is actuated, said spreader means extending downward below said clamp means to thereby engage the material to be cut and pull the same taut before the latter is clamped by said clamping means,
  (c) severing means operative to sever the material pulled taut over the bottom plate by moving downwardly thereagainst through said vertical slot formed in said clamp means after said clamp means have clamped the material to said bottom plate,
  (d) a main block to which said severing means is rigidly secured,
  (e) guide means coupling said clamp means to said main block for vertical shifting motion toward and away from one another within predetermined limtis,
  (f) resilient biasing means effective to bias said clamp means and main block maximally away from one another when said cutting head assembly is deactuated, and
(3) selectively operable drive means coupled to said cutting head assembly for actuating and deactuating the same.

5. A downcutter apparatus for use in conjunction with a work utility secured to a work surface for severing a worked upon article from trailing fabric and filaments, comprising in combination,
(1) a bottom plate secured in operative position close behind the operating head of the work utility and so oriented that work passes thereover after being operated on by said operating head, said bottom plate being vertically slotted through its upper surface with the slot length disposed transversely to the direction of feed of the work utility and including front and rear camming surfaces disposed respectively in front of and behind said slot,
(2) a cutting head assembly disposed in above lying vertically spaced relation to said bottom plate for vertical reciprocation between an upwardly retracted deactuated position and a downwardly extended actuated position, including,
  (a) shiftable clamp means operative when said cutting head assembly is actuated to clamp the material overlying the bottom plate to the latter, said clamping means being formed with a vertical slot extending therethrough oriented for substantially complete registration with the slot through said bottom plate when said cutting head assembly is actuated,
  (b) front and rear resilient spreader means secured to and shiftable with said clamp means conjointly operative with said bottom plate front and rear camming surfaces respectively to grasp the material overlying the bottom plate and pull the same taut across the bottom plate slot when said cutting head assembly is actuated, said spreader means extending downward below said clamp means to thereby engage the material to be cut and pull the same taut before the latter is clamped by said clamping means,
  (c) severing means operative to sever the material pulled taut over the bottom plate by moving downward thereagainst through said vertical slot formed in said clamp means after said clamp means have clamped the material to said bottom plate,
  (d) a main block to which said severing means is rigidly secured,
  (e) guide means coupling said clamp means to said main block for vertical shifting motion toward and away from one another within predetermined limits,
  (f) resilient biasing means effective to bias said clamp means and main block maximally away from one another when said cutting head assembly is deactuated,
(3) selectively operable drive means coupled to said cutting head assembly for actuating and deactuating the same, and
(4) control means coupled to said drive means for selectively operating the same to actuate said cutting head assembly including means responsive to operation of said drive means to cause the automatic deactuation of said cutting head assembly.

6. A downcutter apparatus for use in conjunction with a work utility secured to a work surface for severing a worked upon article from trailing fabric and filaments, comprising in combination,
(1) a bottom plate secured in operative position close behind the operating head of the work utility and so oriented that work passes thereover after being operated on by said operating head, said bottom plate being vertically slotted through its upper surface with the slot length disposed transversely to the direction of feed of the work utility and including front and rear camming surfaces disposed respectively in front of and behind said slot,
(2) a cutting head assembly disposed in above lying vertically spaced relation to said bottom plate for vertical reciprocation between an upwardly retracted deactuated position and a downwardly extended actuated position, including, (a) shiftable clamp means operative when said cutting head assembly is actuated to clamp the material overlying the bottom plate to the latter, said clamping means being formed with a vertical slot extending therethrough oriented for substantially complete registration with the slot through said bottom plate when said cutting head assembly is actuated, (b) front and rear resilient spreader means secured to and shiftable with said clamp means conjointly operative with said bottom plate front and rear camming surfaces respectively to grasp the material overlying the bottom plate and pull the same taut across the bottom plate slot when said cutting head assembly is actuated, said spreader means extending downward below said clamp means to thereby engage the material to be cut and pull the same taut before the latter is clamped by said clamping means, (c) severing means operative to sever the material pulled taut over the bottom plate by moving downward thereagainst through said vertical slot formed in said clamp means after said clamp means have clamped the material to said bottom plate, (d) a main block to which said severing means is rigidly secured, (e) guide means coupling said clamp means to said main block for vertical shifting motion toward and away from one another within predetermined limits, (f) resilient biasing means effective to bias said clamp means and main block maximally away from one another when said cutting head assembly is deactuated, (3) electrically operable drive means coupled to said cutting head assembly main block for vertically shifting the latter between the actuated and deactuated positions of said cutting head assembly, and (4) positioning means partly associated with said cutting head assembly main block and partly associated with said drive means for laterally shifting said cutting head assembly relatively to said drive means and fixedly securing the same in a desired shifted position.

7. The downcutter apparatus according to claim 6 wherein said cutting head assembly main block is a generally T-shaped member having a head piece and a stem piece, said severing means being secured to and said clamp means being coupled to said head piece, and wherein that part of said positioning means which is associated with said main block is associated with said stem piece.

References Cited by the Examiner
UNITED STATES PATENTS

| | | | |
|---|---|---|---|
| 1,402,073 | 1/22 | Kiewicz | 112—74 |
| 1,986,036 | 1/35 | Whistler | 83—140 |
| 2,268,367 | 12/41 | Wood | 112—74 |
| 2,503,353 | 4/50 | Pugh | 83—175 X |
| 2,538,272 | 1/51 | Reimer et al. | 112—125 X |
| 2,987,809 | 6/61 | Burbank | 83—18 X |
| 3,094,031 | 6/63 | Reeber et al. | 112—130 X |

JORDAN FRANKLIN, *Primary Examiner.*

DAVID J. WILLIAMOWSKY, *Examiner.*